May 22, 1934.　　　　G. F. COUCH　　　　1,959,905
RAILWAY TRUCK
Filed Aug. 27, 1929
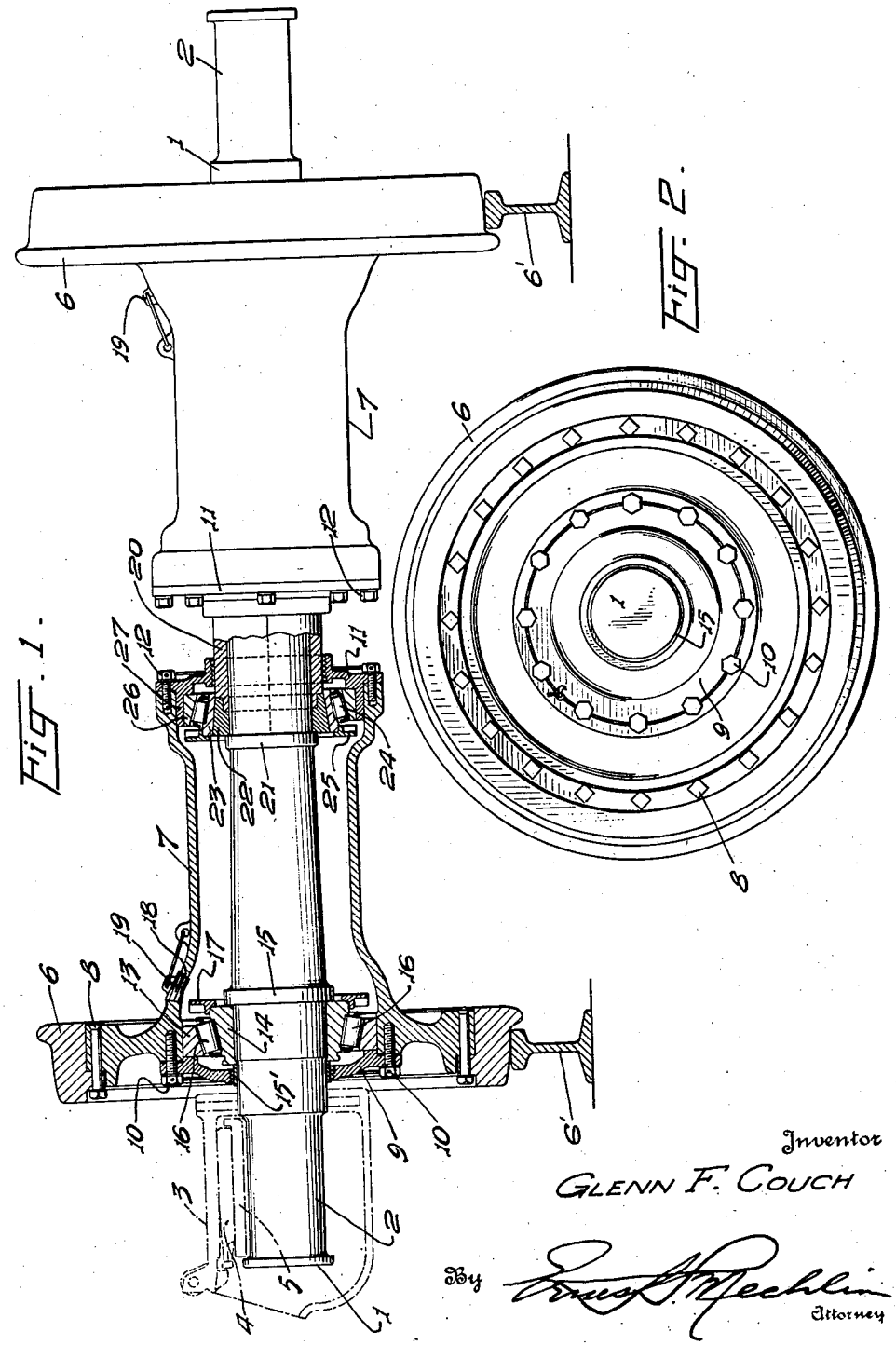
Inventor
GLENN F. COUCH Patented May 22, 1934

1,959,905

UNITED STATES PATENT OFFICE 1,959,905

RAILWAY TRUCK

Glenn F. Couch, Rochester, N. Y., assignor to The Symington Company, New York, N. Y., a corporation of Maryland Application August 27, 1929, Serial No. 388,748

12 Claims. (Cl. 295—38)

This invention relates to railway trucks and, more particularly, to such trucks with roller bearings disposed between the wheels and axles thereof.

The principal object of my invention, generally considered, is to provide a railway truck construction in which the axles are mounted with their journals preferably received in standard journal boxes and the wheels are independently mounted on the axles with roller bearings interposed between said wheels and axles.

Another object of my invention is the provision of a roller bearing construction particularly adapted for railway vehicles in which an axle of approximately normal construction is mounted with its journals received in standard journal boxes, and intermediate said boxes are mounted independently rotating wheels with roller bearing housings and roller bearings disposed between said wheels and housings and said axle.

A further object of my invention is to provide for the independent mounting of wheels on axles with preferably conical rollers therebetween, whereby end as well as radial loads are taken care of.

Other objects and advantages of the invention relating to the particular arrangement and construction of the various parts will become apparent as the description proceeds.

Referring to the drawing illustrating my invention, the scope whereof is defined by the appended claims.

Figure 1 is a side elevation of an axle with wheels and associated roller bearing assemblies mounted thereon, one of said wheels and bearing assemblies being shown in section, and one of the journal boxes, in which is received a journal of the axle, being diagrammatically illustrated.

Figure 2 is an end elevation of the axle and one of the associated wheels.

Referring to the drawing in detail, like parts being designated by like reference characters, there is shown an axle 1 of approximately standard construction as used with railway vehicles such as freight cars. Said axle is shown with journals 2 of standard design adapted for reception in standard journal boxes 3 with which may be employed standard wedges 4 and brasses 5. Said journal boxes, as will be understood, may be associated with side frames as by being formed integral therewith or connected thereto in any desired manner.

Independently mounted on the axle 1 are wheels 6 shown riding on rails 6'. The wheels 6, instead of being rigid with the axle 1 as is customary, are adapted to rotate independently of or freely with respect to one another on said axle and for that purpose have roller bearing housings including the preferably integrally formed body and hub portions of the wheels, or a tubular axle transversely divided into two sections 7, and the tires are connected to such, as by means of bolts or the like 8. Each housing 7 may be closed at its outer end by means of an annular cover 9 connected to the housing 7 by tap bolts 10 or the like, and at its inner end may be closed by an annular cover 11 connected to said housing by tap bolts or the like 12. The housings preferably extend toward one another to adjacent the midpoint between the ends of the axle. Mounted inside of the outer end of each housing 7 is an outer roller bearing raceway 13 and on the corresponding portion of the associated axle 1, or tie for the tubular axle sections 7, is an inner roller bearing cone or raceway 14, the inner end of which preferably abuts the shoulder 15 on the axle, whereby it may be firmly mounted thereon. A bushing 15' is desirably forced over the central axle 1 with its inner end engaging the race 14 for holding it firmly in place. The raceways 13 and 14 form cooperating bearing surfaces engaged by the associated rollers 16 disposed therebetween. Said rollers are preferably conical, as illustrated, with their large ends disposed inwardly so that they are adapted to take end thrusts applied to the wheels as well as radial loads, to thereby prevent relative movement of the wheels longitudinally of the axle and maintain the proper gage. An oil thrower 17 may be mounted on the inner end of the inner race 14, and an oil filling hole 18 closed by a plug 19 may be provided in the housing 7 for replenishing the lubricating material in said housing.

The inner ends of the housings are preferably expanded or increased in diameter, as compared with the intermediate, preferably cylindrical, portions thereof, as shown in Figure 1, the outer ends of said cylindrical portions preferably flaring outwardly and forming, or uniting with, the hubs of the wheels 6. The rolling bearing means at the inner or adjacent ends of the housings 7 are preferably located, as shown, midway of the length of the axles and may be similar to those at the outer ends, but inasmuch as they are not called upon to take as much radial load as the outer roller bearings, the rollers thereof are shown smaller. A preferred construction involves the mounting of a split bushing 20 on the central portion of the axle 1 between spaced collars 21. The split bushings are held in place by split conical bushings 22 upon which are mounted the inner roller bearing races 23 which, besides providing bearings for the small conical rollers 24, serve to keep the bushings 20 and 22 on the axle. On the large or outer ends of the races 23 may be mounted oil throwers 25 corresponding with the oil throwers 17 on the other bearings. In the present embodiment the outer races 26 are preferably applied to flanges 27 on the annular covers or caps 11, which fit inside of the adjacent ends of the housings 7, or annular flange or edge portions thereof expanded or extending outwardly therefrom, said races 23 and 26 providing cooperating bearing surfaces between which the rollers 24 operate. The axle 1 is, therefore, completely enclosed between the wheels by the housings 7 and means coupling or joining the adjacent ends of said housings comprising the covers 11, bushings 20 and associated parts. In order to minimize waste of oil or other lubricant from the housing 7, the surfaces of the covers 9 and 11 adjacent the axle or bushing thereon are preferably corrugated or ribbed, as illustrated.

From the foregoing disclosure, it will be seen that I have devised a wheel and axle construction particularly adapted for use with railway vehicles in which the axle may be of practically standard construction with its journals received in standard journal boxes, the wheels being formed with housings enclosing anti-friction means in the form of roller bearings, whereby each wheel is mounted for independent rotation on the axle which is, therefore, normally stationary with respect to the vehicle. Each housing preferably has a roller bearing at each end, the rollers of which are desirably conical, whereby end thrust and the maintenance of proper wheel gage is provided for without the use of separate thrust bearings, as the corresponding or large ends of the outer set of rollers 16 is directed toward the corresponding ends of the inner set of rollers 24, so that one set of rollers prevents axial wheel shift in one direction and the other set prevents such shift in the opposite direction. It will be apparent that, should the roller bearings fail for any reason, the journals 2 are adapted to turn in the boxes 3. Although a preferred embodiment of my invention is illustrated, it will be understood that modifications may be made without departing from the spirit or scope of the claims appended hereto.

Having now described my invention, I claim:

1. In a railway truck, an axle, a wheel mounted on said axle adjacent each end, each wheel having a housing portion extending toward the other wheel to adjacent the midpoint between the ends of the axle, roller bearings disposed between said housings and axle at both ends of each housing, and means closing the space between the adjacent ends of the housings and the axle.

2. In combination, an axle, a pair of wheels rotatably mounted on said axle, each wheel being provided with a hub portion extending inwardly toward the other wheel and surrounding said axle, said hub portions terminating short of but closely adjacent one another, means closing the space between the inner end of each hub portion and the axle, means enclosing the axle between the adjacent ends of said hub portions, and roller bearings disposed between said hub portions and axle and adjacent said enclosing means.

3. In combination, an axle, housing sections substantially enclosing and independently rotatable on the axle, means closing the annular spaces between the adjacent ends of said sections and the axle, roller bearings interposed between the adjacent ends of said housing sections and said axle, and wheels rigidly connected to said housing sections.

4. In a railway truck, an axle with its ends supported therein, a pair of wheels mounted on said axle between said supports, each wheel having an inwardly extending hub portion surrounding said axle, means closing the ends of said hub portions around said axle, and roller bearings disposed between said hub portions and axle and adjacent said closing means.

5. In a railway truck, an axle, axle housing sections independently mounted on said axle, conical roller bearings interposed between the ends of said housing sections and axle, the outer rollers having the large ends inward and the inner rollers having the large ends outward, and wheels rigid on the outer ends of said housing sections.

6. In a railway truck, an axle extending continuously from end to end, axle housing sections thereon, conical roller bearings interposed between the ends of said housing sections and said axle, the outer roller bearings being disposed with the large ends of the rollers inward and the inner roller bearings being disposed with the large ends of the rollers outward.

7. In a railway truck, an axle, a pair of housings mounted on said axle, a wheel on each housing, roller bearings interposed between said housings and axle, the near ends of the housings terminating short of one another adjacent the midpoint between the ends of the axle, and means on each housing independent of the other housing and closing the spaces between said near ends and the axle.

8. In a railway truck, an axle, a free wheel mounted on said axle adjacent each end, a housing portion connected to each wheel and extending toward the other wheel to adjacent the midpoint between the ends of the axle, roller bearings disposed between said housings and axle at both ends of each housing, and means closing the annular spaces between the adjacent ends of said housing portions and the axle.

9. A tubular axle transversely divided into two sections, a wheel secured to each section, a tie extending thru said axle and serving to hold the sections together, rolling bearing means between the tie and the adjacent ends of the tubular axle sections, and means spaced along the axle and closing the annular opening between the inner end of each axle section and the tie.

10. A tubular axle, wheels secured upon the ends of said axle, a second axle located in the interior of said tubular axle and having its ends extending beyond the ends of the tubular axle to receive a load, and rolling bearings between the two axles, some of said rolling bearings being located approximately midway in the length of said axles and separated by annular partition means.

11. In a railway truck, an axle with its ends mounted therein, a pair of wheels mounted on said axle, each wheel having an inwardly extending hub portion surrounding said axle, means closing the ends of said hub portions around said axle, and conical roller bearings disposed between said hub portions and axle and adjacent said closing means.

12. In a railway truck, an axle, axle housing sections independently mounted thereon, conical roller bearings interposed between the ends of said housing sections and axle, the outer rollers in one housing section having the large ends pointing in the same axial direction as the large ends of the inner rollers in the other housing section, said direction being opposite to that of the inner rollers in the first-mentioned housing section and the outer rollers in the other housing section, and wheels rigid with the outer ends of said housing sections.

GLENN F. COUCH.